May 24, 1966 J. P. BAIER 3,252,554
FLUID GEAR TYPE VARIABLE SPEED DRIVE
Filed July 20, 1964 2 Sheets-Sheet 1

INVENTOR.
JOHN P. BAIER
BY W. E. Finken
HIS ATTORNEY

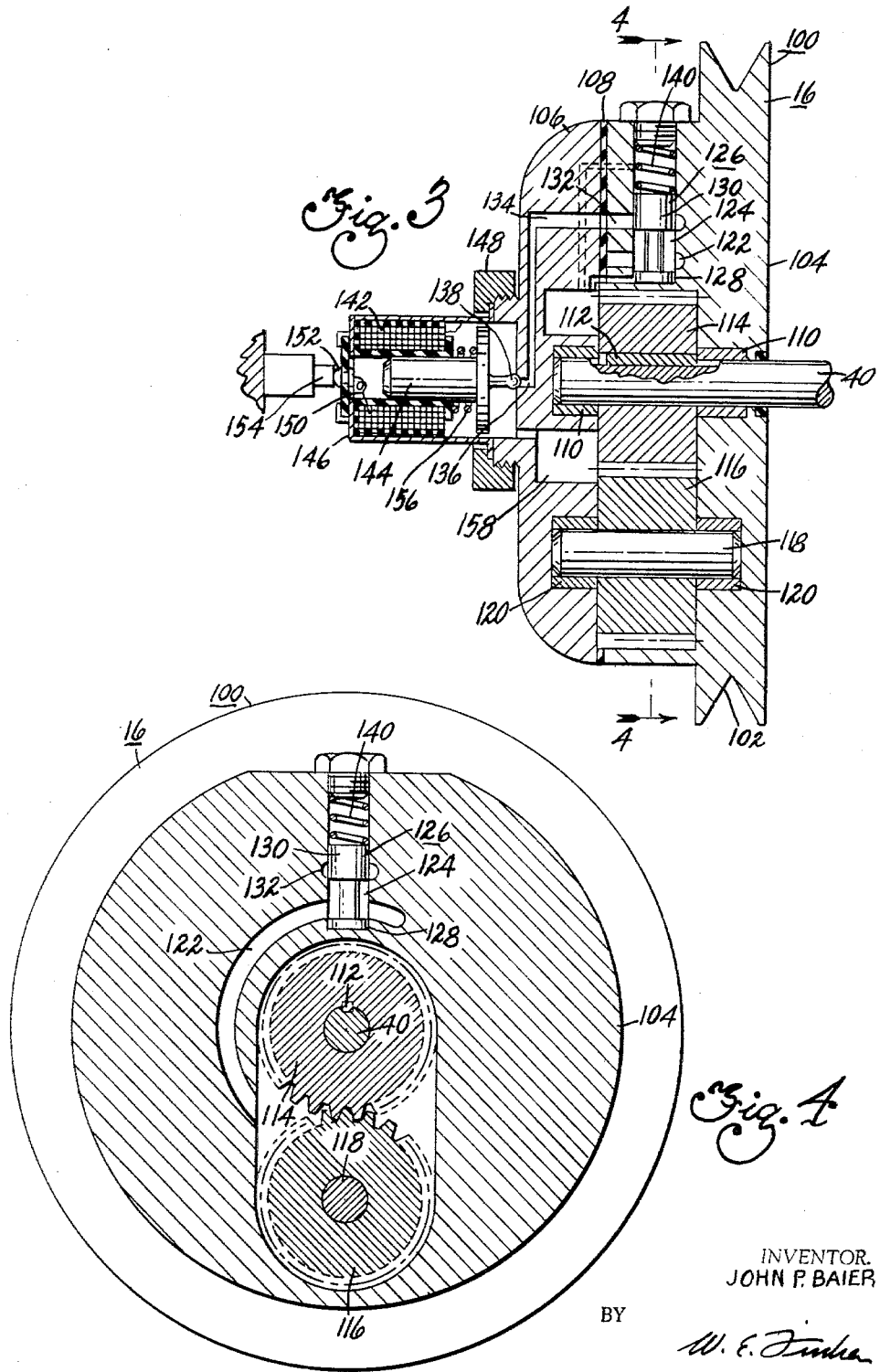

United States Patent Office 3,252,554
Patented May 24, 1966

3,252,554
FLUID GEAR TYPE VARIABLE SPEED DRIVE
John P. Baier, Rochester, N.Y., assignor to General Motors Corporation, Detroit, Mich., a corporation of Delaware
Filed July 20, 1964, Ser. No. 383,604
4 Claims. (Cl. 192—61)

This invention pertains to power trains, and particularly to an improved variable speed drive for transmitting power between driving and driven members.

One of the problems to which no satisfactory solution has been found in the home conditioning field, that is, in the art of heating and cooling buildings during all the seasons of the year, is that of providing economical, reliable and simple mechanism for driving the circulating blower at a relatively low speed during heating and at a higher speed during cooling. It is well recognized that greater quantities of air must be circulated to obtain comfortable cooling during hot weather than are required to obtain comfortable heating during cold weather. In the past, two speed motors have been proposed as well as adjustable pulley arrangements, but none of these have met the three requisites of economy, reliability and simplicity.

The present invention is particularly directed to a variable speed drive assembly for circulating air blowers in air heating and cooling systems. Accordingly, among my objects are the provision of an improved variable speed power train; the further provision of a variable speed drive assembly embodying a closed loop hydraulic system; the further provision of a dual speed drive assembly of the aforesaid type including governor means for maintaining a substantially constant low speed setting irrespective of the load imposed on the drive assembly; and the still further provision of a dual speed drive assembly of the aforesaid type including manually operable means for selecting the output speed thereof.

The aforementioned and other objects are accomplished in the present invention by embodying a closed loop hydraulic system within the power train comprising a gear pump and means for selectively blocking or permitting restricted circulation of hydraulic fluid through the closed loop hydraulic system so as to obtain variable speed operation of the power train.

Further objects and advantages of the present invention will be apparent from the following description, reference being had to the accompanying drawings, wherein preferred embodiments of the present invention are clearly shown, and wherein similar numerals depict similar parts throughout the several views.

In the drawings:

FIGURE 3 is a sectional view of a modified embodiment of the variable speed drive assembly.

FIGURE 4 is a sectional view taken along line 4—4 of FIGURE 3.

Figure 1:
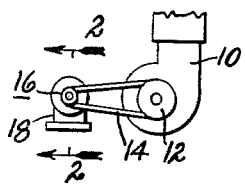
FIGURE 1 is a diagrammatic view of the improved variable speed drive assembly connected to a circulating blower for a heating and cooling system.

Referring to FIGURE 1, the variable speed drive assembly, or power transmitting device, of the present invention is shown in combination with an air circulating blower 10 having a conventional scroll-type casing enclosing a squirrel cage blower wheel, not shown, which is connected to a pulley 12. It is to be understood, however, that this combination is only exemplary and is not to be construed by way of limitation since the power transmitting device can be used as a clutch, a multi-speed drive, or a constant torque device. The pulley 12 is connected by a V-belt 14 to a drive pulley assembly 16 which, in the illustrated embodiment, is coupled in a manner hereinafter described to a conventional alternating current induction motor 18. It is to be understood that the motor 18 and the casing of the blower 10 are attached to a suitable stationary support, not shown, in a manner well known in the art.

Figure 2:
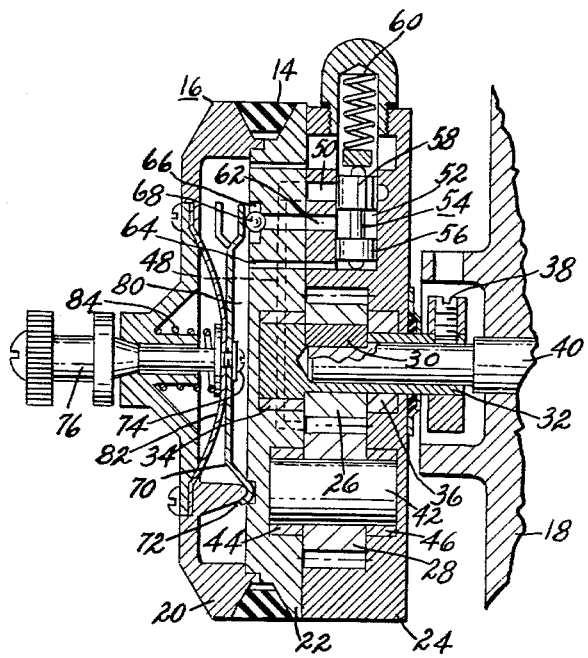
FIGURE 2 is an enlarged fragmentary sectional view taken along line 2—2 of FIGURE 1 depicting the preferred embodiment of the variable speed drive assembly.

Referring to FIGURE 2, in the preferred embodiment the drive pulley assembly 16 includes a pulley member comprising an interconnected sump housing 20 and porting plate 22 which form a V-groove for receiving the V-belt 14. The pulley assembly 16 also includes a pump housing 24 which is connected to the parts 20 and 22 by a plurality of studs, not shown. The pump housing 24 contains a conventional gear pump comprising intermeshing gears 26 and 28. Gear 26 has a spline connection at 30 with a stub shaft 32 journalled in spaced sleeve bearings 34 and 36. The stub shaft 32 is connected by means of set screw 38 to a coaxially arranged input shaft 40 driven by the induction motor 18. The gear 28 has a stub shaft 42 journalled by spaced sleeve bearings 44 and 46 in the porting plate 22 and the pump housing 24, respectively.

The output of the gear pump communicates with a passage 48 in the porting plate, which passage connects with a port 50 of a valve bore 52 which is radially located in the pump housing 24. The valve bore 52 contains a reciprocable plunger, or spool, 54 having spaced lands 56 and 58 separated by an annular groove. The plunger 54 is biased toward the axis of the pump housing by a governor spring 60 and is movable radially outward under the thrust of the centrifugal force through rotation of the pump housing 24.

The valve port 52 connects with an outlet bore 62 and a drain port 64, the outlet port 62 connecting with a port 66 in the porting plate 22 which is normally closed by a ball valve 68 that is held against its valve seat by a leaf spring lever 70 pivoted at 72 between the pulley part 20 and the porting plate 22. This leaf spring lever is connected to a threaded bolt 74 which receives an externally mounted nut 76 located on the axis of the pulley assembly 16. The leaf spring lever 70 is disposed within a chamber 80, one wall of which is formed by a flexible elastomeric diaphragm 82. The chamber 80 constitutes a sump for the closed loop hydraulic system and is connected to the pump input by suitable passage means, not shown. One side of the diaphragm 82 is exposed to atmospheric pressure and is biased towards the porting plate by a spring 84. By rotating the nut assembly 76, the bolt 74 can be reciprocated so as to control the ball valve 68, and thus control the flow in the closed hydraulic loop system in a manner to be pointed out hereinafter. The diaphragm 82 will flex to accommodate changes in hydraulic fluid volume with temperature changes.

With the control knob, or nut, 76 in a position where the leaf spring lever 70 maintains the ball valve 68 seated at all times, hydraulic fluid cannot circulate through the closed hydraulic loop system. Accordingly, upon rotation of the input gear 26 by the drive motor, the pump pressure will increase and the pulley assembly 16 will receive reaction torque and therefore rotate at substantially the speed of the input shaft 40. However, there is a small amount of slip, and therefore a speed differential between the pulley assembly 16 and the motor driven shaft 40. Nevertheless, when the pump output is blocked by ball valve 68 the blower will be driven at high speed. Conversely, when the knob 68 is rotated to withdraw the leaf spring lever 70, the ball valve 68 will be unseated by hydraulic pressure upon radial movement and the valve plunger 54 due to centrifugal force, that is hydraulic fluid from the output of the pump will flow from port 50 to port 62 through the passage 66 so as to unseat the ball valve 68. Under these conditions the drive pulley assembly 16 will rotate at a lower speed determined by the amount of fluid which circulates in the closed loop hydraulic system. Moreover, at low speed the drive pulley will rotate at a substantially constant speed determined by governor spring 60, regardless of the load imposed thereon by the blower. At high speed, however, that is when the pump circulation is blocked, output speed will vary with the load imposed by the blower.

Referring to FIGURES 3 and 4, in the modified embodiment the variable speed pulley assembly 16 again includes a pulley member 100 having a V-belt groove 102 and a plate, or disc, 104 constituting one part of the pump housing, the second part being constituted by a plate 106. A suitable fluid seal, or gasket, 108 is interposed between the two parts of the pump housing which are interconnected by a plurality of studs, not shown. In the modified embodiment, the motor driven shaft 40 is journalled by sleeve bearings 110 in the pump housing and is connected by a spline 112 to a pump gear 114 that meshes with a pump gear 116 attached to a stub shaft 118 journalled in a sleeve bearing 120. As seen in FIGURE 4, the output of the pump flows through channel 122 to valve bore 124 which contains a valve spool 126 having spaced lands 128 and 130. The valve bore 124 has an outlet port 132 connected to a passage 134 in the valve housing 106 that connects with a valve port 136 normally closed by a ball valve 138. The valve spool 126 is normally maintained so that land 130 closes the port 132 by a coil spring 140. The spring 140 constitutes the governor spring as in the preferred embodiment, and upon a predetermined speed of rotation the spool 126 will move radially outward due to centrifugal force to interconnect passage 122 with passage 134 to port 132. If the ball valve 138 remains closed, the drive pulley assembly 16 will rotate at substantially the speed of the motor shaft 40, except for slip. The ball valve 138 is controlled by a solenoid comprising a coil 142 and a plunger 144 contained within a housing 146 coaxial with and attached to the pump housing 106 by a threaded ring 148. One end of the solenoid coil 142 is connected to the pump housing which is grounded, and the other end of the solenoid coil is connected by wire 150 to a terminal 152 on the axis of rotation of the pulley assembly. This terminal, or contact, 152 is engageable by a stationary brush 154 which is connected to the other terminal of a direct current power supply through a suitable switch, not shown.

When the solenoid coil 142 is energized, the plunger 144 is moved axially to the left, as shown in FIGURE 3, against the biasing force of coil spring 156, so as to unseat the ball valve 138 and permit the restricted circulation of hydraulic fluid in the closed loop hydraulic system from the passage 134 through the port 136 to cavity 158 which is connected to the inlet of the pump. As in the preferred embodiment, when the fluid is permitted to circulate through the closed loop hydraulic system from the pump, the drive pulley assembly 16 will operate at low speed, which speed will be substantially constant irrespective of the load imposed by the blower.

While the embodiments of the invention as herein disclosed constitute preferred forms, it is to be understood that other forms might be adopted.

What is claimed is as follows:

1. A variable speed power train comprising, a rotatable driving member, a rotatable driven member, hydraulic reaction torque drive means between said driving and driven members including a closed loop hydraulic system contained within said driven member, said closed loop hydraulic system comprising a pump directly connected to said driving member, centrifugally actuated, radially disposed governor controlled valve means connected in said closed loop hydraulic system, means operable to selectively activate and inactivate said governor controlled valve means to obtain dual speed operation of said driven member comprising a valve having open and closed positions, said valve restricting flow in said closed loop hydraulic system in its open position, and means for controlling the open and closed positions of said valve.

2. The variable speed power train set forth in claim 1 wherein the means for controlling position of said valve includes a solenoid.

3. The variable speed power train set forth in claim 1 wherein the means for controlling the position of said valve comprises a pivotally mounted leaf spring lever, and a manually operable actuator mounted coaxially of said driven member.

4. A variable speed power train comprising, a rotatable driving member, a rotatable driven member comprising a pump housing, a porting plate, and a sump housing, said driven member embodying a closed loop hydraulic system comprising a gear pump having a gear directly connected to said driving member, a sump to which the input of said pump is connected, a governor controlled valve connected to the output of said pump in said closed loop hydraulic system, means operable to selectively activate and inactivate the governor controlled valve to obtain dual speed operation of said driving member, and an elastomeric diaphragm attached to said sump housing and forming one wall of said sump so as to accommodate changes in the volume of hydraulic fluid in said closed loop hydraulic system with changes in temperature.

References Cited by the Examiner

UNITED STATES PATENTS 1,688,852 10/1928 Christie _____ 192—61
3,051,283 8/1962 Bentley _____ 192—61

DAVID J. WILLIAMOWSKY, *Primary Examiner.*

DON A. WAITE, *Examiner.*

A. T. McKEON, *Assistant Examiner.*